United States Patent [19]

Lagelbauer

[11] 4,373,941
[45] Feb. 15, 1983

[54] CENTRIFUGE SEPARATOR

[76] Inventor: Ernest Lagelbauer, 223 W. 21st St., New York, N.Y. 10011

[21] Appl. No.: 234,251

[22] Filed: Feb. 13, 1981

[51] Int. Cl.³ .............................................. B01D 59/20
[52] U.S. Cl. .......................................... 55/401; 55/17; 55/407
[58] Field of Search .................... 55/17, 400, 401, 407, 55/408, 189

[56] References Cited

U.S. PATENT DOCUMENTS

| | | | |
|---|---|---|---|
| 717,963 | 1/1903 | Bardolle | 55/17 |
| 3,837,483 | 9/1974 | Noll | 55/400 X |
| 4,048,067 | 9/1977 | Cheng | 210/512.1 |
| 4,097,375 | 6/1978 | Molitor | 210/512.1 |
| 4,108,620 | 8/1978 | Bohme | 55/17 X |
| 4,278,450 | 7/1981 | Hurst et al. | 55/400 X |

*Primary Examiner*—John Adee
*Attorney, Agent, or Firm*—Austin R. Miller

[57] ABSTRACT

Apparatus for separating material from a flowing gas, isotopes for example, has a stationary vessel 12 with an apertured partition means therein forming two zones. The upper zone is a whirling chamber and contains rotational means to form a rotational flow pattern. The second zone receives the flowing gas through the aperture in the partition means. The lower zone has discharge means for the heavier and lighter materials.

21 Claims, 5 Drawing Figures

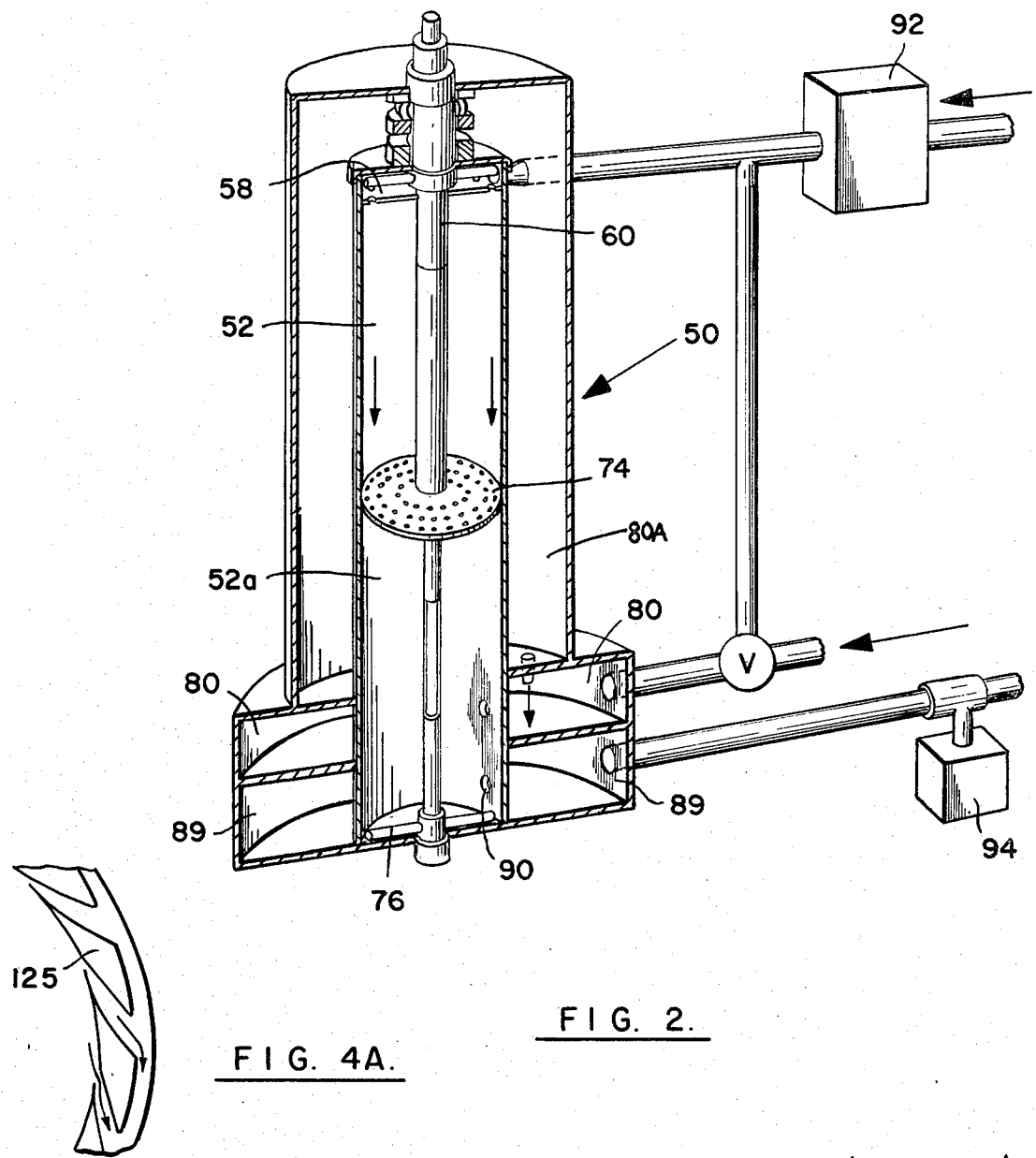
FIG. 2.
FIG. 4A.
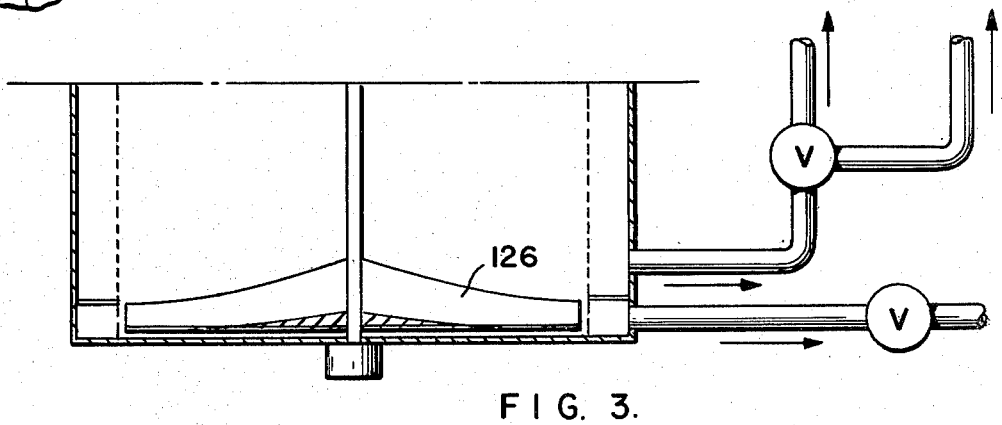
FIG. 3.

CENTRIFUGE SEPARATOR

BACKGROUND OF THE INVENTION

The present invention relates to a method and an apparatus for separating various mixtures of components utilizing the differences inn their mass, utilizing a flow, such as a fluid flow having these components suspended therein. More particularly, the present invention is directed to the mechanical separation of gases and gases having suspended therein solid components.

Isotope separation is presently a necessary process for the enrichment of fissionable fuels for most kinds of nuclear fission reactors, but consumes undesirably large amounts of energy and requires enormous capital investment in respect of process equipment and facilities. For example, conventional separation by gaseous diffusion techniques may consume about 2500 kilowatt hours per separative work unit (KWh/SWU) or more, and may require a complex and massive array of facilities with an amortized capital cost of, for example, over $250. per separative work unit per year.

However, the work of isotope separation has not been done efficiently by conventional separation techniques and apparatus. For example, with reference to the limiting factor of the thermodynamic entropy change in respect of different molecular species, the previously referred to processing energy ratio of 2500 kwh/SWU is more than seven orders of magnitude larger than the energy need for reversing the entropy increment resulting from the mixing at room temperature, of the different atomic weight components of the naturally occurring uranium isotope mixture of $U^{235}F_6$ and $U^{238}F_6$. Accordingly, the potential for substantially improving separative efficiency is high, and substantial research effort, governmental as well as industrial, has been devoted to the improvement of separation systems and techniques. The largest portion of this research effort has been directed to mechanical methods of separation such as those employing gaseous diffusion, centrifugation or curved-jets.

Also, the application of gas centrifugation techniques have been considered with respect to fuel cells, fuel cells mode electric power generation, refining of metals, etc. whose operations are based upon the use of air and/or oxygen enriched air. It is recognized that the efficiency of such operations can be improved by the practicability of using, instead of air, oxygen extracted from the air by means of centrifugation, as the fuel oxidizer.

It is further recognized that the centrifugation techniques are also applicable where the preferred substance for the process is other than oxygen, such as in the extraction of hydrogen from the steam-catalytic processing of coal at moderately high temperatures so as to produce a mixture of steam, hydrogen and carbon oxides wherein the latter can be eliminated by centrifugation.

Centrifugal separation techniques have long been known (e.g., U.S. Pat. Nos. 1,337,774 and 1,508,405) and have found utilization in applications such as separating solids from liquids, oxygen from air, and hydrogen from oil refinery gas. Basic techniques for centrifugal separation of gaseous isotopes were developed during the Manhattan Project (e.g., U.S. Pat. No. 2,536,423), with the development of systems utilizing a counter flow produced through application of a thermal gradient, and the provision of multiple, coaxial moving walls, being more recent events (e.g., U.S. Pat. Nos. 2,876,949 and 3,915,673). Such centrifugal separation systems may employ a spinning chamber surrounded by a vacuum, so that a mixture introduced into the center of the rotating chamber along its axis will tend to be separated into its component parts and such that a higher molecular weight (depleted) stream and a lower molecular weight (enriched) stream may be appropriately withdrawn (e.g., at opposite axial ends of the chamber) by the differential effect of centrifugal work performed on components having different molecular weights.

British Pat. No. 733,786 (Waagner-Biro) discloses a whirling chamber dust cleaning method wherein axially extending outlet ports reach only slightly into the whirling chamber apparently to avoid secondary current flows. Contrary thereto the invention uses secondary current flows to increase the cleaning efficiency as will be explained in detail below. The British Pat. No. 733,786 provides tangential exit ports adjacent the ends of the chamber for the removal of the fine dust. These exit ports are necessary because secondary currents are suppressed.

U.S. Pat. No. 474,490 (Walter) shows a whirling chamber with tangential influx of the flowing, contaminated medium and axial withdrawal of the gas. The axially extending exit pipes are axially adjustable in the extent to which these pipes reach into the chamber. However, the entire gas volume must exit through the axial pipes so that no advantage is taken of the formation of secondary current flows.

There are various disadvantages in respect of prior art gas centrifuges. In this connection, the massive moving wall of a gas centrifuge is at the largest radial distance, resulting in a large moment of inertia which can be a dangerous feature in such processing equipment. However, the most serious drawback of conventional gas centrifuge systems are limitations on the rate at which material may be processed by the equipment. Centrifugal separation of the constituent population is pressure diffusion limited, and this factor limits gas centrifuge throughput. The diffusion time necessary to traverse the radial distances used to provide high wall speed (as well as the axial distance which may be about ten times the radial dimension for in situ cascade centrifuge) is relatively long. This constraint severely limits centrifuge throughput.

In centrifugal systems, the gases co-rotate with the bowl at very high speed, so that there is little fluid dynamic problem with mixing caused by differential wall-gas velocity interaction. The separative flow is diffusion limited, and for a given periphery speed sustainable by a particular strength of material forming the bowl, the smaller the radius, the larger the centrifugal force to drive the pressure-diffusion. However, the high speeds which are necessary present certain difficulties. For example, at a typical radius of 10 cm with a typical wall-speed of 400 m/s, the bowl is already spinning at 38,000 rpm. This combination of very high periphery speed at relatively low throughput is a key bottleneck which drives up the capital cost. Also the weight of the spinning bowl is mostly concentrated at the wall of maximum radius, which gives rise to a large moment of inertia, and at high speeds, becomes a heavy burden to the rotating shaft to undergo sudden dislocation, such as earthquake or the breaking of a neighbouring bowl.

Safety factors can translate quickly into high costs of capital as well as maintenance.

U.S. Pat. No. 4,193,775 (Wang) discloses turbo-separative methods and apparatus for separation of mixtures of gaseous materials having different molecular weights in which differential sedimentation velocities of the components to be separated are established in a laminar boundary layer of the gas adjacent a hydraulically smooth, porous blade surface, and in which a predetermined amount of the boundary layer flow is conducted through the porous surface to stabilize the boundary layer and to provide a higher density gas fraction.

OBJECTS OF THE INVENTION

Accordingly, it is an object of the present invention to provide new methods and apparatus for the separation of components of different masses.

It is a further object of the present invention to provide a novel method and apparatus for separating gaseous components in a manner so that the proportion of the desired component is increased.

It is a still further object of the present invention to provide new methods and apparatus having improved efficiency in the separation of gases of different molecular weights.

SUMMARY OF THE INVENTION

According to the present invention, there is provided an apparatus and method for separating particles of the gas flow in which particles or gaseous particles are suspended by a passage into a stationary vessel having a first zone in which a highly uniformed rotational flow pattern is maintained with a supersonic circumferential fluid velocity, and a second zone into which the fluid mixture passes through a partition means having a multiplicity of minute orifices.

The partition means provides for a high orderly flow pattern of the rotating flowing fluid mass by virtue of thorough drag minimization. The second zone has provided at its low portion at least two discharge passages, one passage for receiving the fluid mixture which is rich in the lighter components and a further discharge passage for discharging the fluid mixture which is rich in the heavier components.

According to the present invention there is a quasi-elimination of the drag between the high circumferential fluid velocity and the wall of the vessel by the continuing abstraction of the steadily forming incipient boundary layer along the chamber wall by the multiplicity of quasi-tangential flow passages at near centrifugal pressure of reception of centrifugally heavier mixture separated in a surrounding annular space while the lighter mixture is discharged likewise at the centrifuge potential pressure at the centrifuge bottom by means of the compressor action effect by an impeller stator blade.

The principal consequence of the abstraction of the boundary layer, which contains the frictional energy losses manifests in turbulence, is the quasi disappearance of the drag effect on the rotating fluid due to degeneration of transmission of momentum across the fluid/surface interface. The minimized drag also implies the avoidance of circulation within the rotary fluid. Contrary to the condition of a porous permeable partition, the "finite" cross-section passages cause merely a moderate pressure drop and related minute flow energy losses.

In accordance with a feature of the present invention, a highly ordered flow pattern of the rotating fluid mass, characterized by $\omega = V_i/r_i = $ constant, is provided in the centrifugal separator by a transverse disc with numerous appropriately distributed flow canals through which the fluid passes to the lower zone, after being acted upon by an impeller blading which imparts a preliminary angular momentum. At the lower portion of the separator are abduction passages. The flow passage discharges the heavier separate-mixture into the surrounding annular receiver space at a pressure close to the centrifugal potential. Similarly, the lighter separate-mixture is obtained at the centrifugal potential pressure, by discharging through a passage at the centrifuge bottom. An impeller stator blading is provided at the centrifuge bottom for promoting the discharge of the lighter component.

Since the power input to the centrifuge results in compression of the fluid in addition to imparting a high velocity to the flow, and inasmuch as the circumferential velocity on behalf of separation efficiency is to be near sonic to supersonic, recovery of these complements is of course of major importance to power requirement; utilization of concerned energy potentials evidently goes to drastically reduce the drive power needed. This power recovery is readily practicable with the present centrifuge because the separates are received at a pressure close to that of the centrifuge intake, and the intrinsic velocity potential is also partially utlizable by means of a turbine. Furthermore, the present centrifuge allows intrinsic enhancement of the concentration of the desired product by fractionally recirculating it.

DESCRIPTION OF THE DRAWINGS

In order that the invention may be clearly understood it will now be described, by way of example, with reference to the accompanyng drawings, wherein::

FIG. 2 is a sectional view through a centrifugal separator illustrating a further embodiment of the present invention;

FIG. 3 shows an enlarged view of the lower portion of the separator;

FIG. 4A shows on an enlarged scale the impeller/stator blading at the lower portion of the separator.

DETAILED DESCRIPTION OF THE PREFERRED EMBODIMENTS

Figure 1:
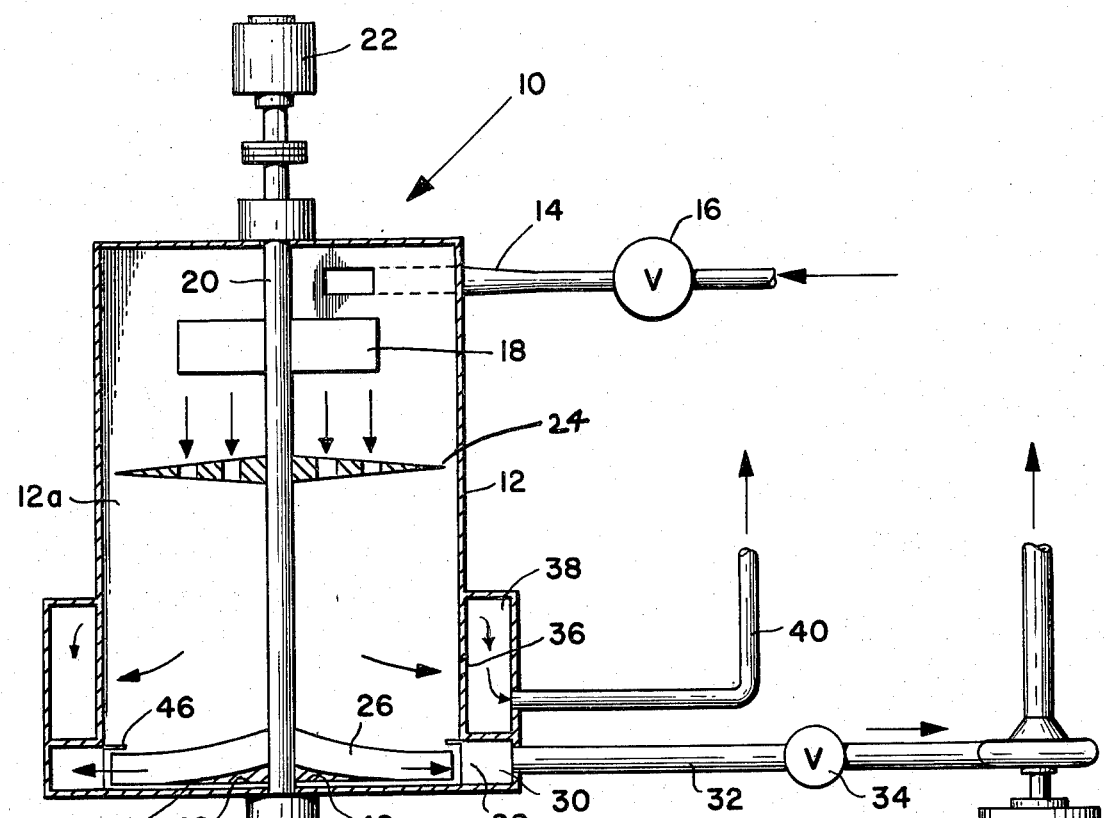
FIG. 1 is a schematic view of one form of centrifugal separator according to the present invention.

As shown in FIG. 1, a centrifugal separator 10 has a chamber 12 into which a fluid mixture enters by injection from the intake pipe 14 through a throttle valve 16, which regulates the rate of fluid flow. As the fluid enters the chamber 12, an optional impeller 18 mounted on a rotary shaft 20 imparts an angular momentum to the fluid being admitted. A drive motor 22 operating at approximately 50,000 rpm creates centrifugal forces which cause an initial separation of the flow components. Due to different particle sizes and weights, different centrifugal forces are effective. A partition means or disc 24 separates the chamber into separate zones. The disc 24 is provided with numerous distribution flow channels or pores through which the fluid passes to lower chamber 12a. A highly ordered flow of the fluid mass enters the chamber 12a and may be acted upon by an optional impeller blading 26 on the rotary disc or bottom plate 44. The impeller blading 26 inhibits turbulence which is induced by the flow retardation due to the drag at the boundary between the rotational flow and the interior surface of the chamber 12. The impeller blading 26 effects the discharging of the lighter substance through a lower spirally oriented passage 28 into a surrounding annular receiver space 30 which passes the lighter substance into a gas discharge 32 for collection or distribution to a further work area. If desired, a throttle regulator 34 may be provided for regulating the rate of take-off.

The flow pattern in the lower chamber 12a of the separator 10 is strictly concentric, characterized by the formula $\omega = v_i/r_i =$ constant, and further by the general flow pattern being consistently outward (centrifugal directed); there are no transverse or oblique streams involved which would cause turbulence and consequent loss of available energy.

The heavier mixture passes through passageways 36, into an annular receiver space 38 for take-off through duct 40 for collection, distribution to a work area or recyclization of all or part of the heavier substance.

The impeller blading is constructed and positioned on the disc 44 so that a minimal drag occurs due to the close-to-vacuum pressure in the gap 42 which is between the impeller 26 and the rotary bottom plate or disc 44 of the chamber 12a.

If desired, an extension 46 is provided annularly along the chamber 12a so as to minimize the flow of the heavier mixture above the impeller blades 26 into the stream of the lighter mixture acted upon by the impeller blading 26.

It has been further found to be advantageous that the passageways 28 consist of one or more suitably contoured and azimuthally spaced passages as shown in FIG. 4A. It has been surprisingly discovered that the separation and collection of the fluid occurs when the passageways are contoured convergingly so as to induce quasi-isentropic expansion of the throughflow which results in a corresponding pressure rise.

In the operation of the separator, both the heavier isotope mixture and the lighter mixture are derived from the centrifuge at close to the centrifugal potential pressure, which largely contributes to the inherent flow dynamics efficiency of the separator. Furthermore, at the relatively high Reynolds numbers which apply, adequate abstraction of the boundary layer containing most of the heavier isotope mixture, can be accomplished satisfactorily by one or a series of passages of appreciable flow area in the stationary container wall for each component separated rather than a porous wall. In contradistinction to a porous wall, these passages offer a relatively small pressure drop and related flow loss.

FIG. 2 illustrates a further embodiment of the invention wherein a separator 50 having an upper whirling chamber 52 separated from the lower chamber 52a by a stationary porous disc 74. The separator 50 is further provided with a precompressor 92 to pre-compress the fluid mixture into the separator. It has been found advantageous in the separation of the components of air to pre-compress the air sufficiently for the nitrogen discharge to be slightly above atmospheric pressure. An advantage of pre-compressing is that the medium is at ambient temperature, whereas in the case of after-compressing, the medium is at considerably elevated temperature and consequently, with pre-compression, far less power is required for further distribution such as to a fuel cell system. Also, due to the operation of the superposed pressure, the centrifugal separator is of a correspondingly smaller size. The reduction of the power required for centrifugation, thus substantially contributes to the excellent efficiency of the plant.

In separator 50, an impeller 58 on shaft 60 creates a rotational flow. It can be seen that the fluid mixture from the compressor 92 enters the eddy or whirling chamber 52 and is bent to tangentially pass along the whirling chamber proper. The resulting angular acceleration results in a centrifugal field which causes the separation of the components. In the case of the separation of oxygen from air, it will be noted that the air may be fed from a precompressor 92, quasitangentially into the whirling chamber 52 wherein the impeller blading 58 on shaft 60 imparts an additional angular momentum to the air flow.

A shaft mounted porous disc 74 transforms the air flow into an orderly rotational pattern as it enters the lower chamber 52a. Flat rotational radial vanes 76 on shaft 60 inhibit turbulence which is induced by the flow retardation due to the drag at the boundary between the rotational flow and the interior surface of the chamber 52a. A receiving space or vessel 80 for the heavier separate surrounds the separator 50 through which the heavier component or oxygen enriched air enters through a passageway. A pressure relief valve controls over-pressure in space 80A into surrounding space 80. The oxygen-receiving vessel receives an oxygen product containing a minimal nitrogen fraction. A nitrogen mixture containing a minimal amount of oxygen is discharged through ducts 90 into a receiver 89. If desired, an expander turbine 94 for utilizing the residual kinetic energy of the discharging nitrogen flow may be utilized. However, this turbine is of use only with a fairly high supersonic circumferential velocity of the rotating flow.

FIG. 2 also shows a connection for partially recirculating the discharge in order to augment the concentration of the produced oxygen. Particularly, for larger plants, arrangement of two or more centrifuges in series is more efficient for enhancing the oxygen concentration. However, the second stage unit may be of a small size due to the elimination of the bulk of the nitrogen by the first stage unit.

It is highly desirable that the radial vanes 76 extend close to the surface of the chamber wall in order to prevent turbulence which would nullify any centrifugal separation action as shown in FIG. 3.

The further treatment of coarse and fine particles, as they are separated from the medium, will depend on the particular circumstances and requirements, for example, the fine particles as well as the coarse particles of the main flow may be supplied to a further separator from collection.

Figure 4:
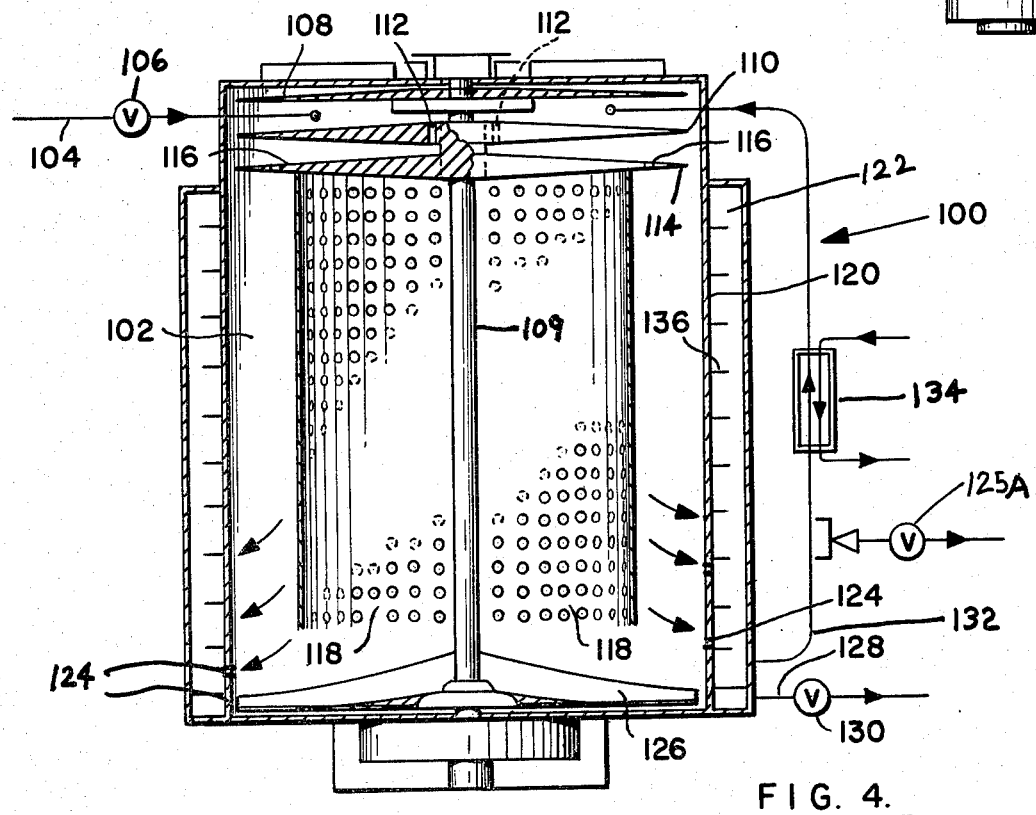
FIG. 4 is a schematic view of a further form of a separator in accordance with the present invention.

According to the embodiment shown in FIG. 4, there is provided a centrifugal separator 100 having an eddy or whirling chamber 102 into which a fluid mixture enters from intake pipe 104 through a throttle valve 106, which regulates the rate of fluid flow. As the fluid enters the chamber 102, a disc 108 mounted on a rotary shaft 109 imparts an angular momentum to the fluid being admitted. A disc 110 also mounted on shaft 109 forms a partition means. The disc 110 is provided with flow channels 112 which are located centrally about the disc. Optionally there may be provided a further perforated disc 114 on a shaft below disc 110 with perforations 116 in the peripheral region of the disc. If desired, a shaft-mounted perforated hollow cylinder may be further provided. At the upper portion of the chamber 102, and below discs 110 and 114 there is provided a porous section 120 of the chamber wall through which the fluid mixture which is rich in the heavier component passes into a surrounding annular receiver space 122. The lighter component of the fluid mixture, because of the centrifugal force, tends a stay close to the rotating shaft and is removed at the bottom of the chamber through passages 124.

An impeller blading on the rotary bottom plate or disc 126 may optionally be provided to effect the discharge of the lighter substance through the passages 125.

The fluid mixture rich in the lighter substance is removed through line 128 which may be provided with a throttle regulator 130 for regulating the rate of take off of the lighter substance.

The mixture rich in the heavy component may be collected for distribution to a secondary unit or, if desired, all or a portion may be recycled into the separator by means of duct or line 132. The recycled heavier component may be heated or cooled as required by passage through a temperature control means 134 prior to recycling into the separator 100.

The recycled inflow and the input or feed are both injected into the upper portion of chamber 102 in the direction of the rotational flow. The entry orifices are preferably located at a pressure region slightly below the pressure within the chamber, that is, at a suitable radial distance.

Thus, there may be three means for imparting angular momentum to the fluid prior to its entry into the lower portion of chamber 102: (1) the upper mounted disc 108 which acts due to the attendant disc-fluid interaction drag, (2) the optional impeller blades on the rotary bottom disc, and (3) by the impeller action of the shaft-mounted transverse discs with axial flow canals.

In the separator of FIG. 4, there is a quasi-elimination of the drag between the high circumferential fluid velocity and the stationary chamber wall by the continual abstraction of the steadily forming incipient boundary layer by a plurality of quasi-tangential flow passages into a surrounding annular space at near centrifugal pressure and discharge therefrom while the residual lighter mixture is discharged at the centrifugal potential pressure near the bottom of the separator by means of the compressor action effect of the impeller and stator blading provided.

The invention is not limited to a whirling chamber with a substantially cylindrical, primary flow. The invention may be practiced with a primary flow having any desired shape, for example, the primary flow may have a ring shape. Also, instead of a precompressor, vacuum means may be provided at the discharge end of the separator depending upon the components to be separated and their molecular weights or particle sizes. Still further, the separator because of the internal pressure may be provided with reinforcement hoops 136. Thus, although the invention has been described with reference to specific example embodiments, it will be appreciated, that it is intended to cover all modifications and equivalents within the scope of the appended claims.

I claim:

1. Apparatus for separating a specifically lighter or heavier component from a flowing medium having suspended therein components of different densities, said components including gases and/or particles, the apparatus comprising at least one stationary vessel having an apertured partition means therein forming two zones and establishing an orderly flow pattern for the flowing medium, a first upper zone forming a whirling chamber in which the flowing medium is placed into coaxial rotational flow pattern, rotational means in said first zone for establishing said rotational flow pattern, and a second zone to which the flowing medium enters through the apertures in said partition means said zone having at least two discharge means, one of said discharge means being provided for withdrawing a fluid mixture which is rich in the lighter component and the other of said discharge means being provided for withdrawing a fluid mixture which is rich in the heavier component said partition means having a multiplicity of minute orifices for establishing an orderly flow pattern.

2. The apparatus according to claim 1 including a rotational disc at the bottom of said second zone for stabilizing the rotational flow of the fluid mixture coming through said partition means.

3. The apparatus according to claim 1, wherein said disc includes vane means.

4. The apparatus according to claim 1 in which said partition means comprises a porous disc.

5. The apparatus according to claim 1 including means for substantially tangentially injecting fluid medium near the top of said first zone.

6. The apparatus according to claim 1 or 5 including means for precompressing said fluid medium prior to injection into said first zone.

7. The apparatus according to claim 1 wherein said discharge means are contoured and azimuthally spaced passages.

8. The apparatus according to claim 1 including means for recycling at least a portion of the separated components.

9. The apparatus according to claim 1 including an expander turbine associated with one of said discharge means.

10. The apparatus according to claim 1 including means for regulating the rate of discharge of components from said discharge means.

11. The apparatus according to claim 1 including extension means above said rotational means for minimizing the flow of the heavier component into the stream of the lighter component.

12. Apparatus for separating a specifically lightest component from a flowing medium having suspended therein components of different densities, said components including gases and/or particles, said apparatus comprising a stationary vessel having at least one rotary disc therein at the upper portion of said vessel, each disc having perforations formed therein for passage of the flowing medium and establishing a uniform flow pattern of said flowing medium, said vessel having a porous portion in which a fluid mixture which is rich in the heavier component is withdrawn, and discharge means near the lower portion of the vessel for discharging a fluid mixture which is rich in the lighter component.

13. The apparatus according to claim 12, including a rotational disc at the bottom of said vessel for stabilizing the rotational flow of the fluid mixture.

14. The apparatus according to claim 13, wherein said disc includes vane means.

15. The apparatus according to claim 12, including means for substantially tangentially injecting the fluid medium about the top of said vessel and above said rotating disc means.

16. The apparatus according to claim 12, wherein said discharge means for said lighter component are contoured and azimuthally spaced passages.

17. The apparatus according to claim 12, including means for recycling at least a portion of one of the separated components.

18. The apparatus according to claim 12, including means for regulating the rate of discharge of the separated components from said vessel.

19. The apparatus according to claim 12, including means for reinforcing said vessel.

20. The apparatus according to claim 12, in which said rotary disc means is a single disc provided with axial bores near the center.

21. The apparatus according to claim 20, including a second rotating disc means having axial bores near its periphery.

* * * * *